United States Patent [19]

Medding et al.

[11] 4,145,724

[45] Mar. 20, 1979

[54] AUTOMATED MAGNETIC TAPE CARTRIDGE RETRIEVAL HANDLING AND REPLAY MACHINE

[75] Inventors: Reuben Medding, North Caulfield; Peter D. Kaye, Glen Waverley, both of Australia

[73] Assignee: Consolidated Electronic Industries Pty., Ltd., Australia

[21] Appl. No.: 816,911

[22] Filed: Jul. 18, 1977

[30] Foreign Application Priority Data

Jul. 16, 1976 [AU] Australia ............................. PC6658
Dec. 20, 1976 [AU] Australia ............................. PC8551

[51] Int. Cl.$^2$ ...................... G11B 15/68; G11B 23/04
[52] U.S. Cl. ...................................... 360/92; 414/136
[58] Field of Search ........................... 360/92, 71–72, 360/12, 69; 353/25, 26 R; 214/11 C

[56] References Cited

U.S. PATENT DOCUMENTS

| | | | |
|---|---|---|---|
| 3,584,879 | 6/1971 | Ban | 360/92 |
| 3,779,560 | 12/1973 | Yokata | 360/92 |
| 3,831,197 | 8/1974 | Beach et al. | 360/71 |
| 3,938,190 | 2/1976 | Semmlow | 360/92 |
| 3,947,882 | 3/1976 | Lightner | 360/92 |
| 3,996,617 | 12/1976 | Cousino | 360/92 |

FOREIGN PATENT DOCUMENTS

1396367 4/1975 United Kingdom ...................... 360/92

*Primary Examiner*—Alfred H. Eddleman
*Attorney, Agent, or Firm*—Murray & Whisenhunt

[57] ABSTRACT

Apparatus for storing, retrieving and replacing information contained within discrete magnetic tape information bearing cartridges comprising a storage area for storing a plurality of said cartridges each having a predetermined and designated location in the storage area; at least one processing station for extracting information from individual cartridges; computer memory means for storing a play schedule for sequential movement of said cartridges through said processing station; mechanical selection means operatively connected to said computer memory means operable in response to signals received therefrom to retrieve an individual cartridge and transferring it to the processing station and for returning same to its designated location in the storage area; servo motor means driving said mechanical selection means, said servo motor means being driven by power transmitted to it as a result of said computer signals; current feed back loop interconnecting said servo motor output and said computer output whereby the positioning of the selection mechanism at a designated location of a said cartridge is self correcting.

6 Claims, 5 Drawing Figures

AUTOMATED MAGNETIC TAPE CARTRIDGE RETRIEVAL HANDLING AND REPLAY MACHINE

The invention relates to automated magnetic tape cartridge retrieval handling and replay machines particularly but not exclusively useful for radio broadcasting studios.

Tape replay machines are commonly in use which can play a cartridge type tape with information thereon wherein an endless loop of said tape is wound into the cartridge. When the cartridge is inserted into the machine and the machine actuated the tape is moved through a recording head thus recording programs, music advertisements and spot messages such as time and weather can be played. After playing the tape continues to be wound and since it is endless it eventually reaches the beginning of the segment whence the cartridge is removed from the machine and returned to a library.

The cartridge includes multiple tracks some of which carry material to be played whilst one track is reserved to record signal tones which are used to control a replay machine playing the tape. Thus there is a tone to stop the machine, another to provide fast forward or provide external relay operation for auxiliary equipment.

Such cartridges are presently stored in libraries which requires transfer of designated cartridges from the library to the play studios according to the day's program. Also cartridges are required to be manually loaded into replay machines and played by the program announcer.

Such replay machines are commercially available under the trade mark CUEMASTER 900 Series.

The present invention is particularly adapted for use with such standard replay machines, however, other types of replay machines would also be suitable for use.

U.S. Pat. No. 3,584,879 to Itsuki Ban issued June 15, 1971 discloses a cartridge searching means controlled by tone markings on the tape.

Also U.S. Pat. No. 3,779,560 to T. Yokata discloses a cartridge storing means, a means for carrying a cartridge from the storage to the playing means and from the playing means back to the storing means and electric control means.

Still further, U.S. Pat. No. 3,831,197 to L. R. Beach discloses a data retrieval system including a plurality of article transporting means movable in two dimensions.

Still further, U.S. Pat. No. 3,938,190 to J. L. Semmlow discloses a system for storing and retrieving information-bearing units or modules, such as magnetic tape cassettes, including a fixed two-dimensional storage array, a fixed processing or play station for extracting information from the units, and a movable selection mechanism, having three degrees of freedom, for retrieving individual modules from the storage area, transferring them to the processing area and then returning them to the storage area after the information contained therein has been extracted. Additionally, the system includes means for automatically sequencing a series of units, as well as a preprocessing station for cueing up individual units for intra-unit accessing.

This patent also discloses means for initializing each individual information bearing module (cartridge or cassette) before next being processed at the tape recording station.

These prior specifications are hereby incorporated by reference.

It is an object of the present invention to provide a machine which will store a large number of individual cartridges including handling and replay mechanisms whereby each cartridge can be automatically selected and played as desired.

It is a further object of the invention to provide a computer controlled machine comprising an automatic computer controlled random access library of tape replay cartridges. The computer in one form of the invention is capable of controlling access to retrieval and playing of cartridges contained in a library of up to 2,500 cartridges.

As an item of broadcasting studio equipment the invention provides a machine which can form the main program source for a broadcast station and can be additionally supplemented by other program source equipment such as reel to reel reproducers, pre-recorded time announcements and live studio productions. All these sources can be controlled and initiated by the machine of the present invention.

It is a still further objective of the invention to provide a machine including a frame having at least one rack in the frame for holding a plurality of tape cartridges at least one tape replay machine, a cartridge selecting mechanism adjacent the rack, the selecting mechanism including cartridge engaging and gripping means movable between said rack and said replay machine, a computer operatively connected to said selecting mechanism including said engaging means, said computer being operable to control movement of the selecting and engaging means, the engaging means being operable to retrieve and replace a predetermined cartridge from said rack and said replay machine according to a predetermined computer program.

It will be understood that the computer may be a millicomputer having a non volatile ferrite core memory. For example, a Computer Automation LSI 305 millicomputer. Alternatively a micro computer having a volatile memory such as a micro computer marketed by INTEL 80/10.

To ensure accurate positioning of the selecting and engaging mechanism at the point of engagement with a selected cartridge the invention provides a computer look up table. The selector mechanism conveniently includes a servo motor driving the engaging mechanism through mechanism drive means such as chains. The servo motor is driven in response to signals sent by the computer.

The positioning accuracy of the selecting and engaging mechanism is required to be 0.1% of total travel of the engaging mechanism in the vertical direction. However, mechanical tolerances caused by e.g. back lash and inertia loads in the drive train together with electronic inaccuracies can lead to errors of up to 0.5%.

Accordingly, it is an object of the present invention to provide a computer look up table allowing access to the computer output to vary the input to the servo motor mechanism if the position of the engaging mechanism is required to be corrected.

The look up table enables an operator to precisely position the servo mechanism, however, it has been found that additional safeguards are necessary to ensure that long term drift of the selector positioning is avoided.

To this end it is an additional objective of the invention to provide a photo electric sensing device operable in conjunction with the cartridge engaging means providing fine and accurate positioning of the cartridge engaging device after the device has been moved into the vicinity of the cartridge to be selected.

There is provided by the present invention an automatic tape cartridge handling and replay machine including a frame at least one rack in the frame for holding a plurality of tape cartridges, at least one replay machine, a cartridge selecting mechanism adjacent the rack including cartridge engaging means movable between said rack and said replay machine operable to retrieve or replace a cartridge from the rack and the replay machine.

In a more specific form of the invention there is provided an automatic cartridge handling and replay machine including a frame, a plurality of racks arranged side by side for holding a library of cartridges in a tiered formation, a tape replay machine located near the foot of said racks, a computer, a servo motor mechanism controlled by said computer, a selecting mechanism driven by said servo motor mechanism capable of traversing the length and breadth of said racks and including cartridge selection means for selecting in use any one cartridge in the racks transporting it to the replay machine and subsequently returning it to the rack all in response to signals transmitted to the servo motor mechanism by the computer.

The present invention also provides a checking mechanism built into the cartridge tape replay machine which enables the computer to check against its memory as to whether the cartridge is the correct one selected.

The present invention may also provide a modification wherein the selector mechanism may perform a loading operation from a random magazine store of cartridge tapes.

There is provided according to the present invention a process for automatically loading a tape means into a predetermined location comprising the steps of placing information on a predetermined portion of the tape placing the tape means into storage means in random order but accessible to a selector means capable of retrieving the tape means from the storage means, playing the tape means in a replay machine to read said information, recording the information in a memory means and instructing the selector means to load the tape means into said predetermined location.

conveniently the storage means is a magazine capable of holding up to 50, preferably 20 to 40, cartridge tapes positioned where normally a replay machine would be positioned.

The loading can be carried out by the machine during normal operation of the cartridge handling machine. Thus when the selector mechanism is not busy loading or unloading replay machines from the library rack the mechanism can select a cartridge from the magazine, play it in a vacant replay machine to record the relevant information in the memory of the computer and place the cartridge in the library rack.

Thus the invention can provide a completely automatic facility for loading the library rack in addition to the automatic handling of the cartridge already in the library.

The invention will be described in more detail having reference to the accompanying drawings in which.

Figure 1:
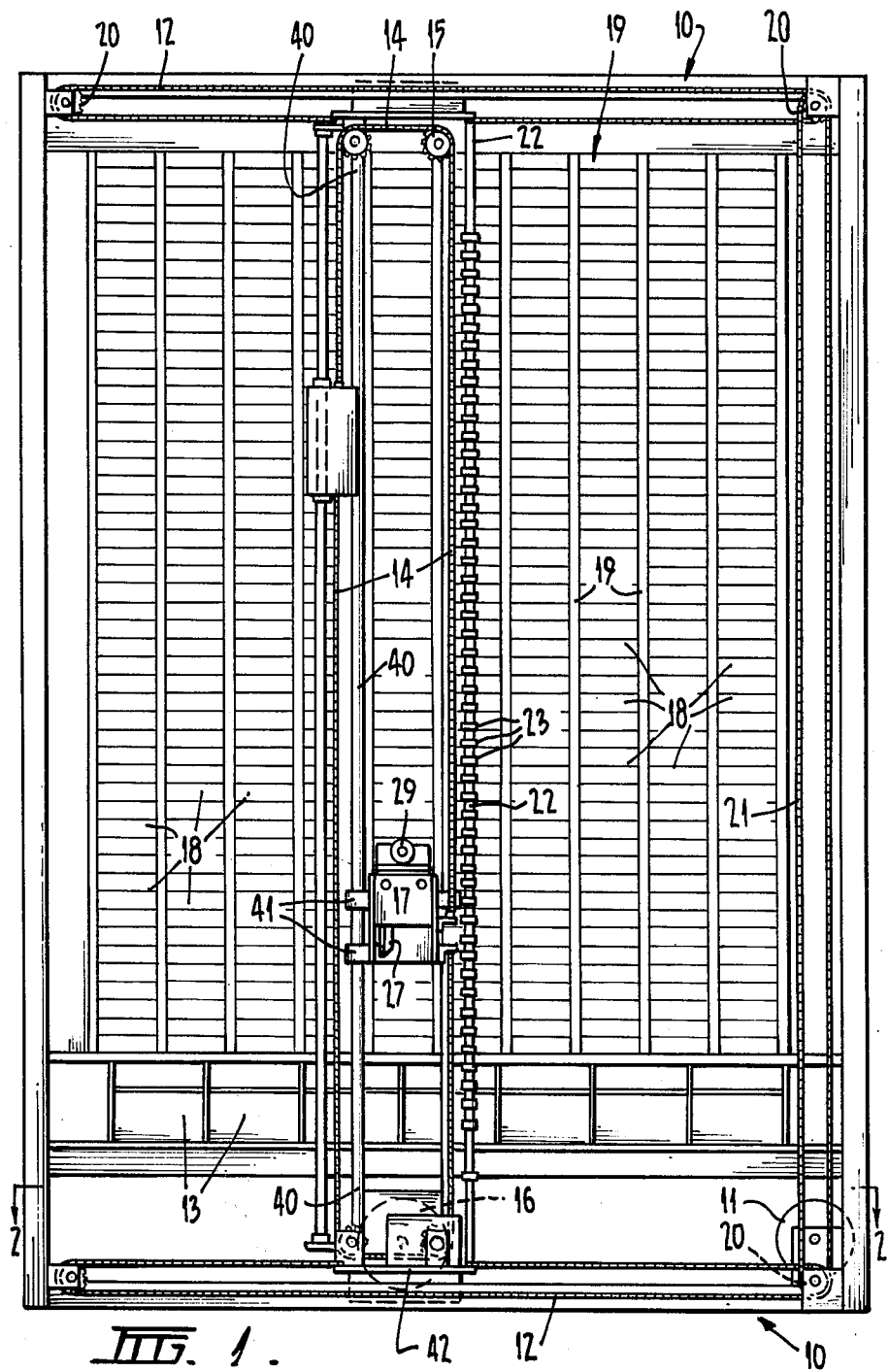
FIG. 1 is a frontal view of the machine showing the cartridge racks and engaging mechanism together with the photo electric sensing device.
Figure 2:
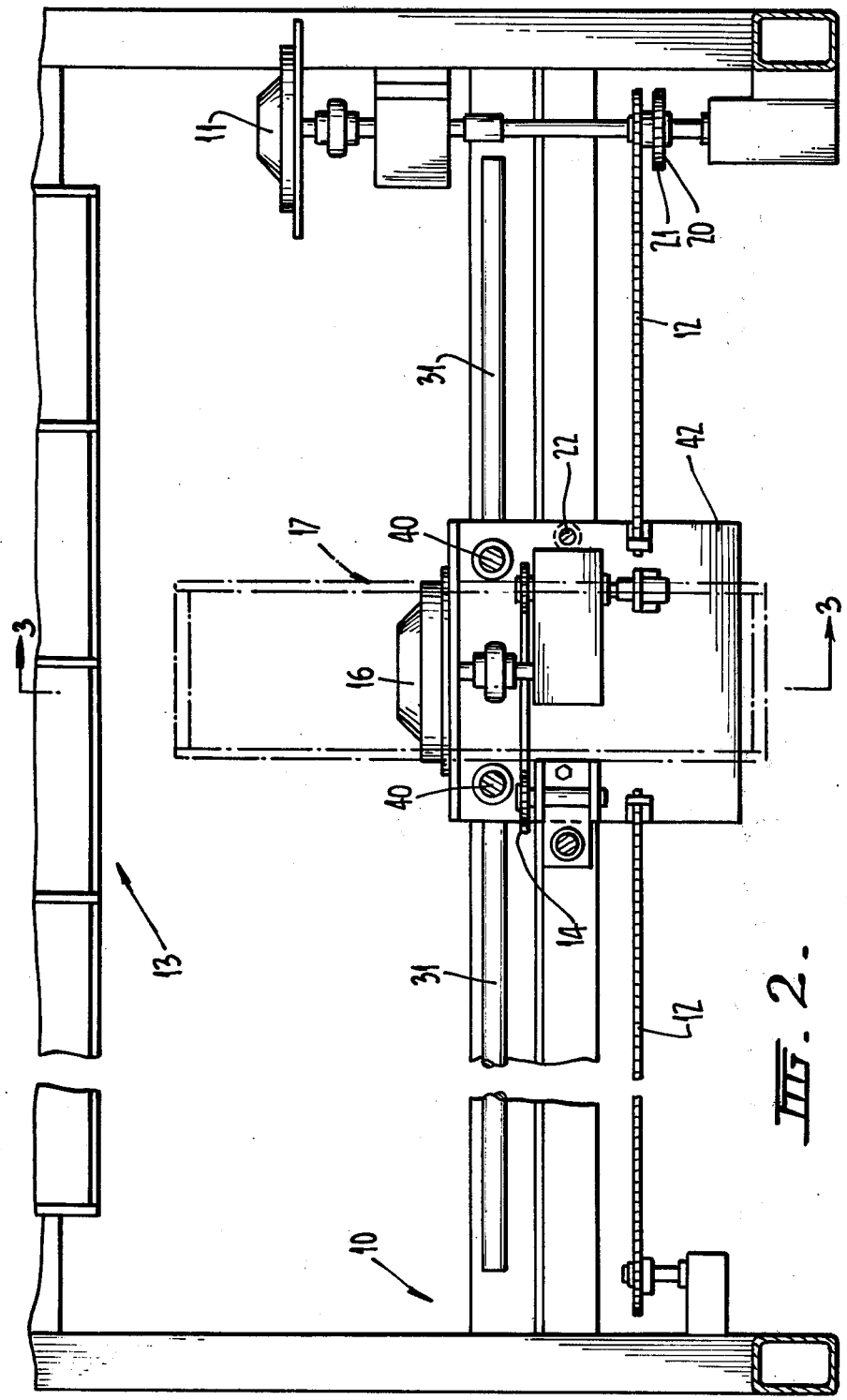
FIG. 2 is a partial plan view of the machine showing the cartridge engaging mechanism and servo motor drive and drive train.
Figure 3:
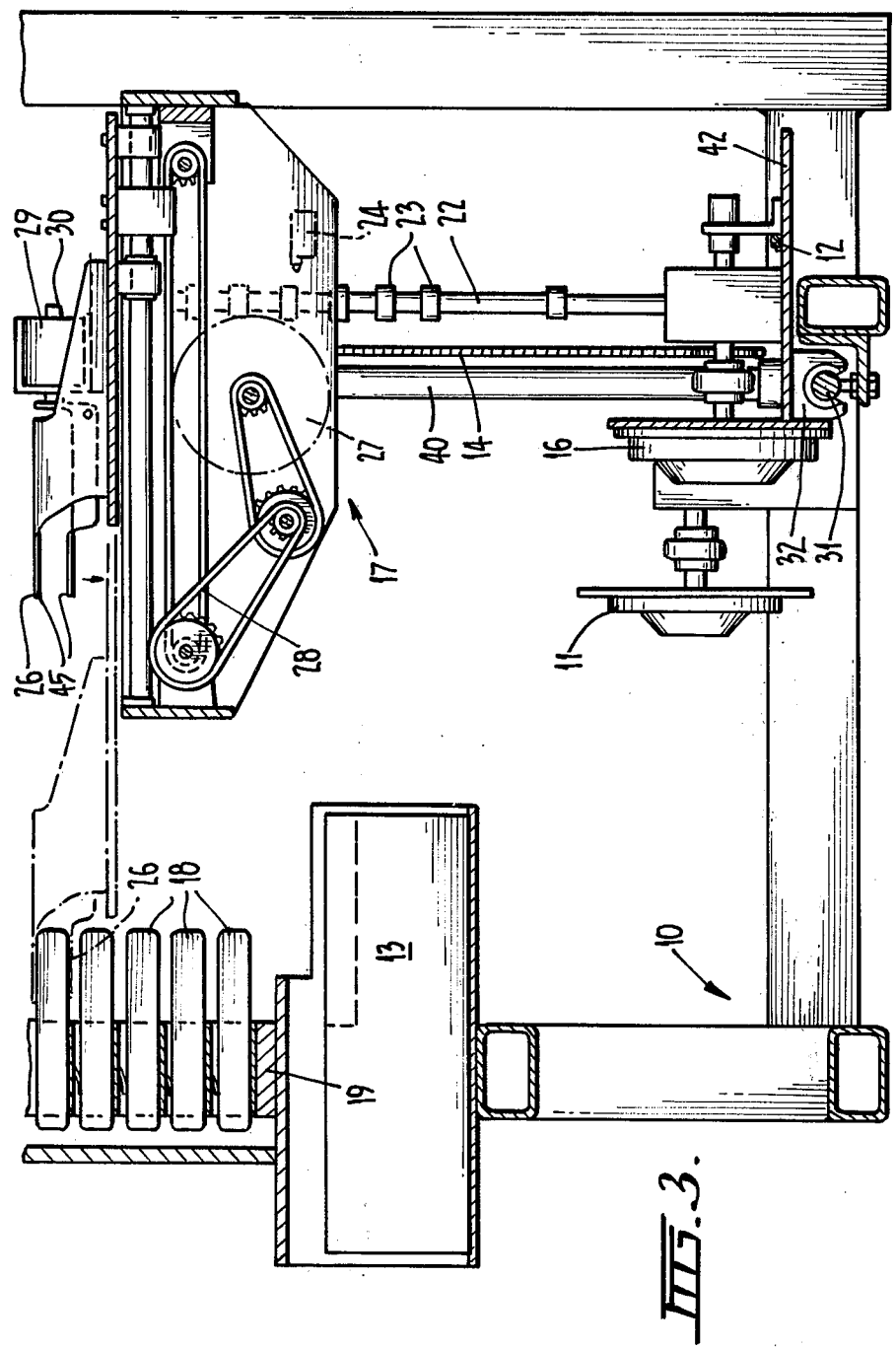
FIG. 3 is a side view on a larger scale of the cartridge engaging mechanism and servo motor showing the relative positioning of some cartridge and a replay machine.

Having reference to FIGS. 1, 2 and 3, these drawings show the mechanical construction of the storage racks, servo motors and cartridge selecting and engaging mechanisms.

The racks 19 are housed in a sturdy frame 10. In the arrangement shown there are 10 racks each storing 50 tape cartridges 18. The cartridges are of the endless tape variety as are well known in the recording art. A series of tape recorders 13 are mounted preferably at the base of the racks.

The recorders are commercially available, the CUEMASTER 906 being suitable for the purpose.

The selecting mechanism includes a travelling head 17 which is capable of traversing horizontally (X axis) vertically (Y axis) and depthwise (Z axis) under the influence of servo motors which are controlled by a computer as will be described in more detail later.

The travelling head 17 is mounted for vertical movement on rods 40 which slidingly engage guides 41 on the head 17. The rods 40 are mounted on a travelling frame 42 for horizontal movement on horizontal rods 31 which slidingly engage guides 32. The travelling head 17 is connected to the endless chain 14 which traverses a rectangular path around sockets 15. The frame 42 is in turn connected to chain 12 which is driven through sprockets 20 by a servo motor 11. Servo motor 16 drives chain 14.

Referring to FIG. 3, the travelling head 17 includes a motor 27 driving through a gear box and driven to an endless chain 28 upon which is mounted a cartridge engaging device 26. The device includes a frame 43 slidably mounted on rod 44 for movement to and from the cartridge rack.

The gripper mechanism 26 includes an electrically actuated solenoid for clamping and releasing the jaws 26 on or from a cartridge.

The travelling head includes a photo electric sensor device 24 operating in conjunction with rings 23 mounted on rod 22. This will be described in more detail later.

The position of the gripper mechanism 26 is controlled automatically such that it can be directed to any one of the cartridges or positions in the rack 19 to retrieve or replace a cartridge 18. Each access position of the gripper mechanism corresponds to an access command control by which the drive motors 11 and 16 and then 27 are commanded to move to an access position for replacing or retrieving a command control selected cartridge. Thus in the horizontal direction there are 10 designated positions corresponding to the centre line of each rack 19 of cartridges 18 and in the vertical direction there are 50 designated positions following along the centre line of the cartridge racks 19.

In the lateral direction the gripper or picking mechanism is traversed to either extend it forward to grasp a cartridge or replace a cartridge in the rack 19, or a retracted position for transport to and from a replay machine 13.

There is a safety gap equal to one cartridge length between the position of a cartridge correctly stored in the rack and the position of a cartridge traversing in the horizontal and vertical directions.

The engaging FIG. 26 best shown in FIG. 3 includes two spring fingers with a soft coating 45 actuated by the solenoid actuating mechanism 29 for moving the fingers laterally into engagement with a selected cartridge to retract and transport the cartridge.

Each cartridge location has a designated position or access number and this is the sole location of each cartridge when stored in the rack and not being played.

A designated cartridge will be withdrawn from its position and transferred to a designated replay machine. As before, it will remember which cartridge is in which replay machine. On loading into the replay machine, the cartridge will be started and a recording on the control track will state the number of the cartridge. This will be checked by the computer against its memory of what the number should be and if it is correct, the cartridge will be allowed to queue up to its program material and an okay indication given.

If it is incorrect, the cartridge will be rejected by the picking mechanism and a warning indicated together with a printout on either a video display unit, or a printer.

Figure 5:
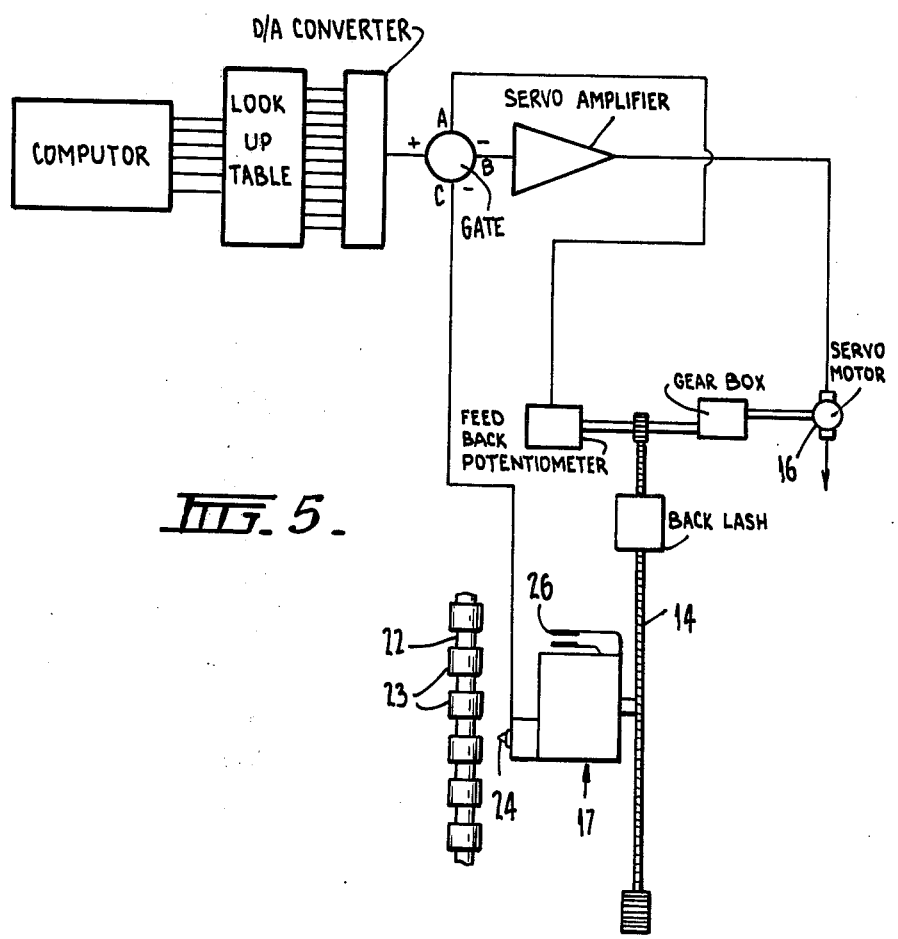
FIG. 5 is a block diagram schematically showing the computer controlled selecting mechanism.

Referring to FIG. 5, the computer controls the servo motors moving the travelling head 17. In the X and Y axes of movement of the travelling head there are 51 discrete Y axis positions, namely, the 50 vertically disposed cartridges in each rack and the relative vertical position for entry into the tape recorders 13.

There are 16 discrete X axis positions for the travelling head, namely, the 10 racks and six tape recorders. The Y axis positions require 6 bits of digital information and the X axis positions require 4 bits of digital information to specify all positions in the computer.

The basic arrangement of computer, servo amplifier and servo motor is interconnected to provide a self correcting feed back system in which a given access signal in transmitted from the computer to the servo amplifier thence to the servo motor. The access signal is transmitted through the gate to the servo amplifier from point B current will be transmitted whilst there is imbalance in the gate between points A and B.

The servo motor will be driven by the amplifier while this imbalance exists. Current proportional to the position of a potentiometer is fed back to the gate to point A and movement of servo motors (and thus the travelling head) takes place until there is current balance between points A and B whence current to the servo amplifier drops to zero and the motors stop.

However, there are inherent non-linearities in such a simple feed back system caused by mechanical backlash and electronic inaccuracies. Such inaccuracies can be up to 0.5% which is greater than the 0.1% necessary for accurate positioning of the travelling head relative to the selected cartridge.

This requires that 12 bit position commands be provided as this gives a capability of positional adjustment to 0.02% accuracy.

This requires the use of a look up table in combination with a digital/analogue converter. Such devices are commercially available and manufactured by Analogue Devices Inc. e.g., Type DAC 12QZ and described in U.S. Pat. Nos. 3,747,088 and 3,685,045.

Since there are inherent non-linearities in the feedback system described above, a linear digital to Analogue Converter would cause positioning errors in the system. Thus controlled delinearization of the Digital Analogue Converter is necessary so that its output can be tailored to match the non-linearity of the system. To achieve this either of two methods are used, viz:

A. Using a computer automation LSI 3050 millicomputer with non volatile core memory the 6 bit (or 4 bit) Y axis (X axis) position commands are converted to 12 bit position commands via a look up table. This look up table is programmable such that if the servo motor is required to drive the travelling head to Y position No. 25 (Binary No. 011001), the computer would address memory Y25, the content of this address is the 12 bit data which is sent to a precision 12 bit Digital converter whose output is strictly controlled by the 12 bit input.

If the operator inserts 0000,0000,0000 at address Y25 the output is 0 volts. If on the other hand the content of Y25 was 111111111111 the output would be 10 volts (the absolute maximum output of the converter).

Thus there are now 4096 (2") discrete positions or bits that can correspond to the instruction "go to Y25."

The typical output required for Y25 is 5 volts (because there are 50 Y positions) i.e. ½ output would have 011111111111 in the Y25 address.

In any particular selection mechanism on the machine the 5 volt output may not be precisely correct because of its inherent non-linearities. If the operator wished to change the Y25 selection position one adds or subtracts from the look up table to compensate for the nonlinearities (i.e., a 1 bit change results in an 0.02% position change of the travelling head.

B. The other method uses an Intel 80/10 microcomputer (where memory is volatile when power is turned "off") to construct a hardward programmable digital to analogue converter where only the 6 Y axis bits (or 4 X axis bits) are given to the converter. The technique here is to "weight" the 6 bits using potentiometers to delinearize the Digital Analogue converter so that it linearity can be varied over a ± 1% range.

This ensures that even with the maximum servo non-linearity of 0.5% the Digital Analogue converter can still track the non-linearity of the system.

Despite the abovementioned safeguards against inaccuracies in the system, errors can still occur in the Y (vertical) axis caused by unforeseen mechanical backlash (loose chain) and long term drift in the electronic circuitry. Accuracy is the most critical in the Y direction.

To overcome these problems an optical feed back loop is used to ensure precise positioning of the Y axis at all times (drift in the X axis is not critical).

This technique uses a reflective sensor device 24 and adjustable sensing rings 23 (see FIG. 5). 51 sensing rings are provided one for each finite Y position on racks and tape recorders.

The sensor uses an infra-red to light emitting diode 60 and a photo transistor 61. The sensing rings 23 are polished and chrome plated and are mounted on a matt black (non reflective) vertical shaft 22 which spans the complete Y axis on one side of the travelling carriage 17.

The sensor 24 is mounted on the travelling carriage 17 and as it passes over any one of the sensing rings it generates a voltage which changes rapidly on each edge of the sensing ring as regions of high reflectance transfer to regions of low reflectance. This rapid change it output from the sensor is used to add into the Digital Analogue converter voltage at the gate shown in FIG. 4 and hence will allow extremely fine positioning. The proportional range of the optical system is deliberately restricted to about 1% of the total travel of the travelling carriage.

This allows for a two step control, i.e., the Digital Analogue converter now acts as a coarse controller which puts the gripper optical sensor over any one of the 51 rings at which time the fine control system (optical) takes over and positions the gripper over an edge of that sensing ring. Note that only one edge of the ring is stable (negative feedback), the other edge is unstable (positive feedback).

Once on the unstable edge the servo will automatically drive to the stable edge which coincides with accurate positioning of the gripper mechanism 26 and a given cartridge.

By adjusting the sensing rings in the vertical direction, the servo will now follow the stable edge of the rings so that absolute positioning of the gripper 26 in the Y direction is now possible and thus drift inaccuracies in the Digital Analogue converter, servo amplifier and system backlash are now automatically corrected.

Figure 4:
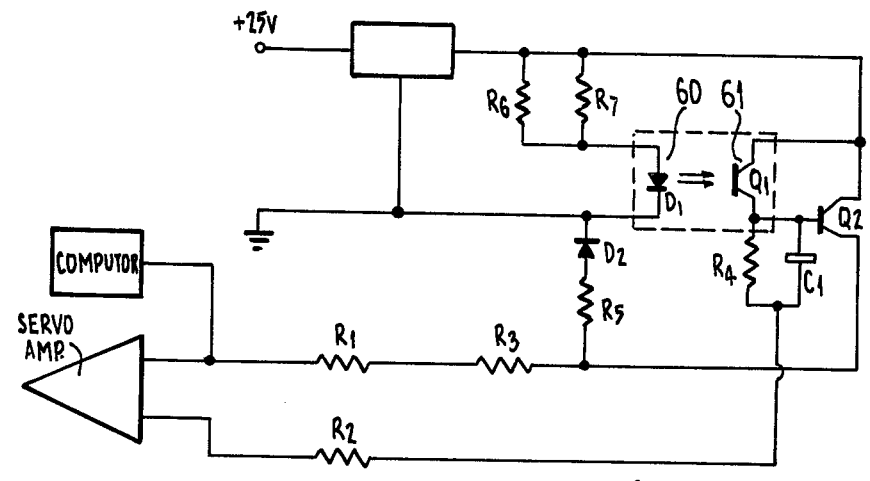
FIG. 4 shows the circuitry for the optical sensing device for the cartridge engaging device.

With reference to FIG. 4, the circuit shows photo diode $D_1$ 60 and transistor $Q_1$ 61 for receiving reflected light from rings 23. Transistor $Q_2$ and the RC circuit $C_1R_4$ provide a stabilizing circuit for the current generated by the photo circuit. Resistors $R_1$, $R_2$ and $R_3$ have the effect of dividing the high voltage generated to a value many times less to further stabilise the signal fed back to the gate controlling the servo amplifier.

The computer can be used to check for various system fault conditions, e.g.:
(a) broken tapes or jammed tape in a cartridge;
(b) low level recorded tapes;
(c) high wow and flutter in the recorded tapes;
(d) defective replay transport;
(e) incorrectly coded cartridge.

Faults (a) and (b) are sensed by an audio fail detector which will automatically start the next event and display an alarm to indicate the fault.

Fault (c) is sensed by recording a continuous frequency tone on the separate cue track on the tape, if quality is lower than certain predetermined limits the cartridge is rejected and the next event started.

Fault (d), if power supply to the player fails the computer will unload that player and reload that event into the next available player.

Fault (e), the cue track of the tape is recorded with digital information which corresponds with its code number. The computer can check this information against its memory and if parity is not obtained the event can be rejected.

The computer is expandible to control up to five libraries of cartridges each containing up to 500 separate cartridges.

The computer desirably incorporates a standard visual display data terminal which can in the application of the present invention provide a continuous visual display of programs:
(i) current status;
(ii) next 10 selected events;
(iii) actual time;
(iv) elapsed time;
(v) system alarm;
(vi) syntax error;
A typical display is as follows:

TYPICAL DISPLAY
time: 10.58 am.     Elapsed time: 02.58.

| EVENT | FUNCTION CODE | SOURCE | RACK POSITION | STATUS | |
|---|---|---|---|---|---|
| 0145 | 2 | 1 | 104 | 1* | |
| 0167 | 1 | 2 | 206 | 2 | 1059 |
| 0168 | 2 | 1 | 394 | 2 | |
| 0169 | 3 | 0 | 001 | 0 | |
| 0170 | 2 | 0 | 002 | 0 | |
| 1000 | 2 | 0 | 003 | 0 | |
| 1001 | 4 | 0 | 004 | 0 | |
| 1003 | 2 | 1 | 245 | 3 | |
| 1003 | 2 | 1 | 192 | 4 | |
| 1004 | 2 | 1 | 345 | | |
| 0146 | 6 | 5 | 807 | | |
| 0147 | 5 | 0 | 167 | | |
| 0148 | 1 | 2 | 145 | | |
| Enter data | 7 | | | | |
| | | Error | | | |

LIST OF FUNCTION CODES
FUNCTION CODES:
FUNCTION 0 — skip
When ever a function 0 is programmed the controller will ignore that event even though there are other numbers programmed in that event.

FUNCTION 1 — Manual start
The system will play this event but will stop at the end of this event, unless a remote manual start push button is held down in which case the system will start the next event when this event's end of message pulse is delivered to the controller.

FUNCTION 2 — Automatic start
This system will play this event and will start the next event when this event's O.E.M. cue is played, i.e., Function 2 is the same as Function 1 with the remote start button continuously held down.

FUNCTION 3 — Link event
This function will link two events together so that time interupts (Function 6) will not break this bracket linked with Function 3's. A Function 3 will link the NEXT event to this event.
Note:
1. That if a timed event occurs while a Function 3 event is playing it will start but, will not be "aired" until the end of the next event after the Function 3 event.
2. That if a timed event (Function 6) is linked (FN3) to the previous event it will be started after the Function 3 event or if it has already been started by a time command it will be "aired": immediately after the Function 3 event has finished.

FUNCTION 4 — Multiple start
This event will start at the same time as the *Previous Event*. However since there are two events on air at the same time only one EOM cue will be allowed to control the next event this E.O.M. will be the last one to occur, i.e., when a Function 4 is programmed the first E.O.M. is ignored and the next event is started on the second E.O.M.
Note: If consecutive Function 4's are programmed only the first Function 4 in the sequence will be multiple started and subsequent Function 4's will only act as Function 2's (i.e., Automatic start).

FUNCTION 5 — Go to
This Function is *Always* followed by a four digit code which will be the next event to play. This addressed event will also have it's own function code.

FUNCTION 6 — Timed event

When Function 6 is programmed it is also followed by a 4 digit code which indicated the time that the next event will start, the event that will start at this time is always the following event.

Function 6 allows an event to start at any second in a 1 hour period.

Example:

| EVENT | FUNCTION | SOURCE | POSITION | STATUS |
|-------|----------|--------|----------|--------|
| 2133  | 6        | 5      | 931      |        |
| 2134  | 1        | 1      | 408      |        |

At time 59 minutes and 31 seconds into the hour event 2134 will occur, i.e., Cartridge 408 (Row 40 Column 8) will start and after finishing will transfer the system to manual control at the end of its message (Event 2134 has a Function Number 1).

| FUNCTION | KEYSTROKE | OPERATION |
|----------|-----------|-----------|
| RETURN | (return) | Readies computer to accept next command. |
| QUERY | (Q) (plus 4 digit event number) | Displays event queries plus event before and event after. |
| SCROLL FORWARD | (F) | Scrolls forward events in 'QUERY' display. |
| SCROLL BACKWARD | (B) | Scrolls backward 'QUERY' display. |
| DATA INPUT | (D) | Removes Cursor from Control of computer enabling data to be entered. |
| DATA (Numerical) | (0-9) | Denotes: Event number, Function number; Source, Cartridge position and Time. |
| SPACE | (SPACE BAR) | Shifts Cursor to the right of 'DATA ENTRY' display. |
| CLOCK PRESET | (C) (plus 4 digit event number) (Plus**hours **Mins ** Seconds AM or PM) | Used after "O" or "Z" Function. Presets computer clock starting time against event number prior to Manual Start (S). |
| TIME CORRECTION | (T) (Plus 6 digits hoursMins ** seconds) (plus AM or PM) | Corrects Computer Clock such as after power failure e.g. 9.25pm entered as (T) 09 25 00 PM. |
| START/RE START | (S) | Starts replay of first event displayed. |
| EMERGENCY STOP/MUTE | (E) | Mutes on air audio immediately Source continues to run to end message cue, program advances next event and awaits 'START' (S) signal. |
| ORDERLY SHUTDOWN | (O) | Terminates program at end of on air and unloads all replay. |
| DECK POSITION | (P) (Plus deck No. 0-6) | DATA ENTRY display shows memory address of deck selected. |
| LIBRARY X SERVO POSITION | (X) (Plus column No. 0-9) | DATA ENTRY display shows memory address of column selected. |
| LIBRARY Y SERVO POSITION | (Y) (Plus Row No.00-49) | DATA ENTRY display shows memory address of Row selected. |
| GRIPPER Z (a) Servo Position (Library) | (Z) (Plus Cartridge No. ****) | Positions XY Servo at selected cartridge position. |
| (b) Servo 10 position (Replay Units) | (Z) (Plus deck position No. 500-506 | Positions XY Servo at selected replay unit position. | information bearing cartridges comprising a storage area for storing a plurality of said cartridges each having a predetermined and designated location in the storage area; at least one processing station for extracting information from individual cartridges; computer memory means for storing a play schedule for sequential movement of said cartridges through said processing station and having a computer output, said computer output including a look up table allowing access to the computer output to enable adjustment of the computer output; mechanical selection means operatively connected to said computer memory means operable in response to signals received therefrom to retrieve an individual cartridge and transfer it to the processing station and to return same to its designated location in the storage area; motor means driving said mechanical selection means, said motor means being driven by power transmitted to it as a result of said computer

We claim:

1. Apparatus for storing, retrieving and replacing information contained within discrete magnetic tape signals; voltage feed back loop interconnecting the motor output and said computer output whereby the positioning of the selection mechanism at a designated location of a said cartridge is self correcting.

2. Apparatus for storing, retrieving and replacing information contained within discrete magnetic tape information bearing cartridges comprising a storage area for storing a plurality of said cartridges each having a predetermined and designated location in the storage area; at least one processing station for extracting information from individual cartridges; computer memory means for storing a play schedule for sequential movement of said cartridges through said processing station; mechanical selection means operatively connected to said computer memory means operable in response to signals received therefrom to retrieve an individual cartridge and transfer it to the processing station and to return same to its designated location in the storage area; motor means being driven by power transmitted to it as a result of said computer signals; voltage feed back loop interconnecting said motor output and said computer output whereby positioning of the selection mechanism at a designated location of said cartridge is self correcting; second voltage feed back loop means comprising a photoelectric sensing circuit on the selector means and a plurality of discrete reflecting bodies mounted adjacent said sensing circuit and relative to individual cartridges in the storage area for providing an overriding power supply to said motor means after said positioning of the selection mechanism at a designated location to accurately locate said selecting mechanism.

3. Apparatus for storing, retrieving and replacing information contained within discrete magnetic tape information bearing cartridges comprising a storage area for storing a plurality of said cartridges each having a predetermined and designated location in the storage area; at least one processing station for extracting information from individual cartridges; computer memory means for storing a play schedule for sequential movement of said cartridges through said processing station; mechanical selection means operatively connected to said computer memory means operable in response to signals received therefrom to retrieve an individual cartridge and transfer it to the processing station and to return same to its designated location in the storage area; motor means driving said mechanical selection means, said motor means being driven by power transmitted to it as a result of said computer signals; voltage feed back loop interconnecting said motor output and said computer output whereby the positioning of the selection mechanism at a designated location of a said cartridge is self correcting; said computer output including a look up table allowing access to the computer output to enable adjustment of the computer output; said feed back loop being supplemented by an additional voltage feed back loop means for providing an overriding power supply to said motor means after said positioning of the selection mechanism at a designated location to accurately locate said selecting mechanism and comprising a photoelectric sensing circuit on the selector means, a plurality of discrete reflecting bodies mounted adjacent said sensing circuit and relative to individual cartridges in the storage area.

4. Apparatus for storing, retrieving and replacing information contained within discrete magnetic tape information bearing cartridges comprising a storage area for storing a plurality of said cartridges each having a predetermined and designated location in the storage area; at least one processing station for extracting information from individual cartridges; computer memory means for storing a play schedule for sequential movement of said cartridges through said processing station; mechanical selection means operatively connected to said computer memory means operable in response to signals received therefrom to retrieve an individual cartridge and transfer it to the processing station and to return same to its designated location in the storage area; motor means driving said mechanical selection means, said motor means being driven by power transmitted to it as a result of said computer signals; voltage feed back loop interconnecting said motor output and said computer output whereby the positioning of the selection mechanism at a designated location of a cartridge is self correcting, said computer memory means being connected to the motor means via a computer look up table allowing access to the computer output and via a digital analog converter for conversion of the computer output to drive the motor means.

5. Apparatus for storing, retrieving and replacing information contained within discrete magnetic tape information bearing cartridges comprising a storage area for storing a plurality of said cartridges each having a predetermined and designated location in the storage area; at least one processing station for extracting information from individual cartridges; computer memory means for storing a play schedule for sequential movement of said cartridges through said processing station; mechanical selection means operable in response to signals received therefrom to retrieve an individual cartridge and transfer it to the processing station and to return it to its designated location in the storage area; motor means driving said mechanical selection means, said motor means being driven by power transmitted to it as a result of said computer signals; voltage feed back loop interconnecting said motor output and said computer output whereby the positioning of the selection mechanism at a designated location of a said cartridge is self correcting, said feed back loop being supplemented by an additional voltage feed back loop comprising a photoelectric sensing circuit on the selector means and a plurality of discrete reflecting bodies mounted adjacent said sensing circuit and relative to individual cartridges in the storage area, said additional feed back loop providing an overriding power supply to said motor means after said positioning of the selection mechanism at a designated location to accurately locate said selecting mechanism; said computer memory means being connected to the motor means via a computer look up table allowing access to the computer output and via a digital analog converter for conversion of the computer output to drive the motor means.

6. Apparatus of claim 5, wherein said storage area is a fixed storage area having a plurality of cartridges therein in a tiered formation.

* * * * *